(No Model.) 2 Sheets—Sheet 2.
W. E. BAXTER.
CAMPER'S KIT.
No. 561,756. Patented June 9, 1896.
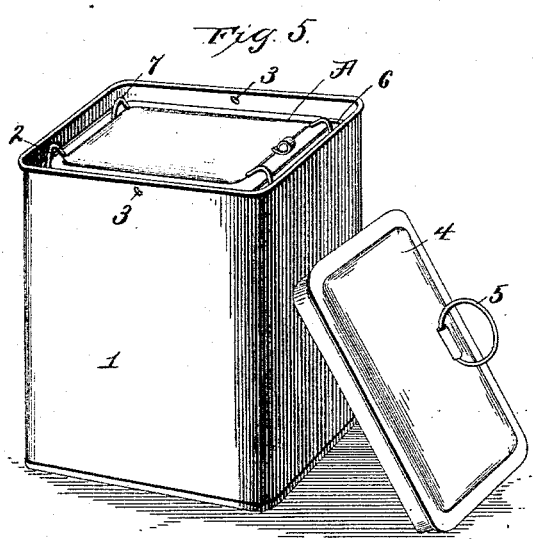
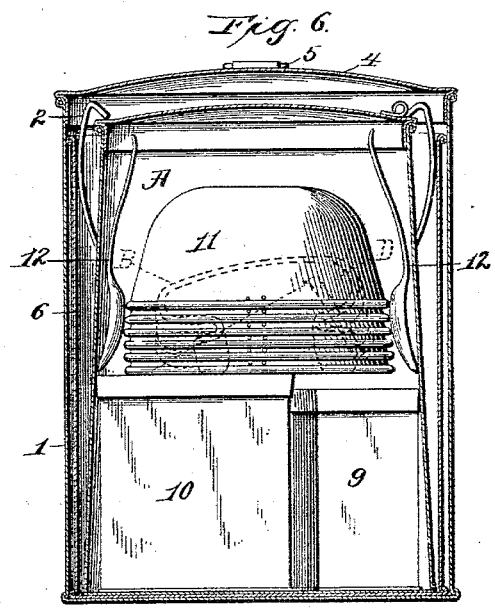
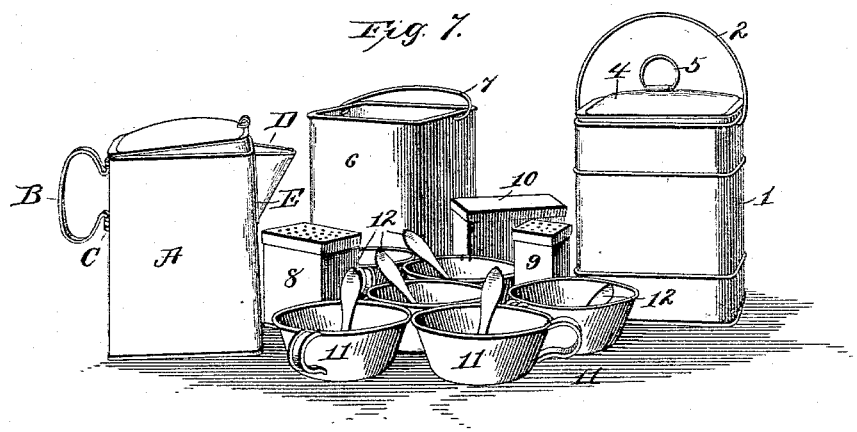
Witnesses
E. C. Wurdeman
S. J. Williamson
Inventor
William E. Baxter
by Geo. H. Holgate
Attorney

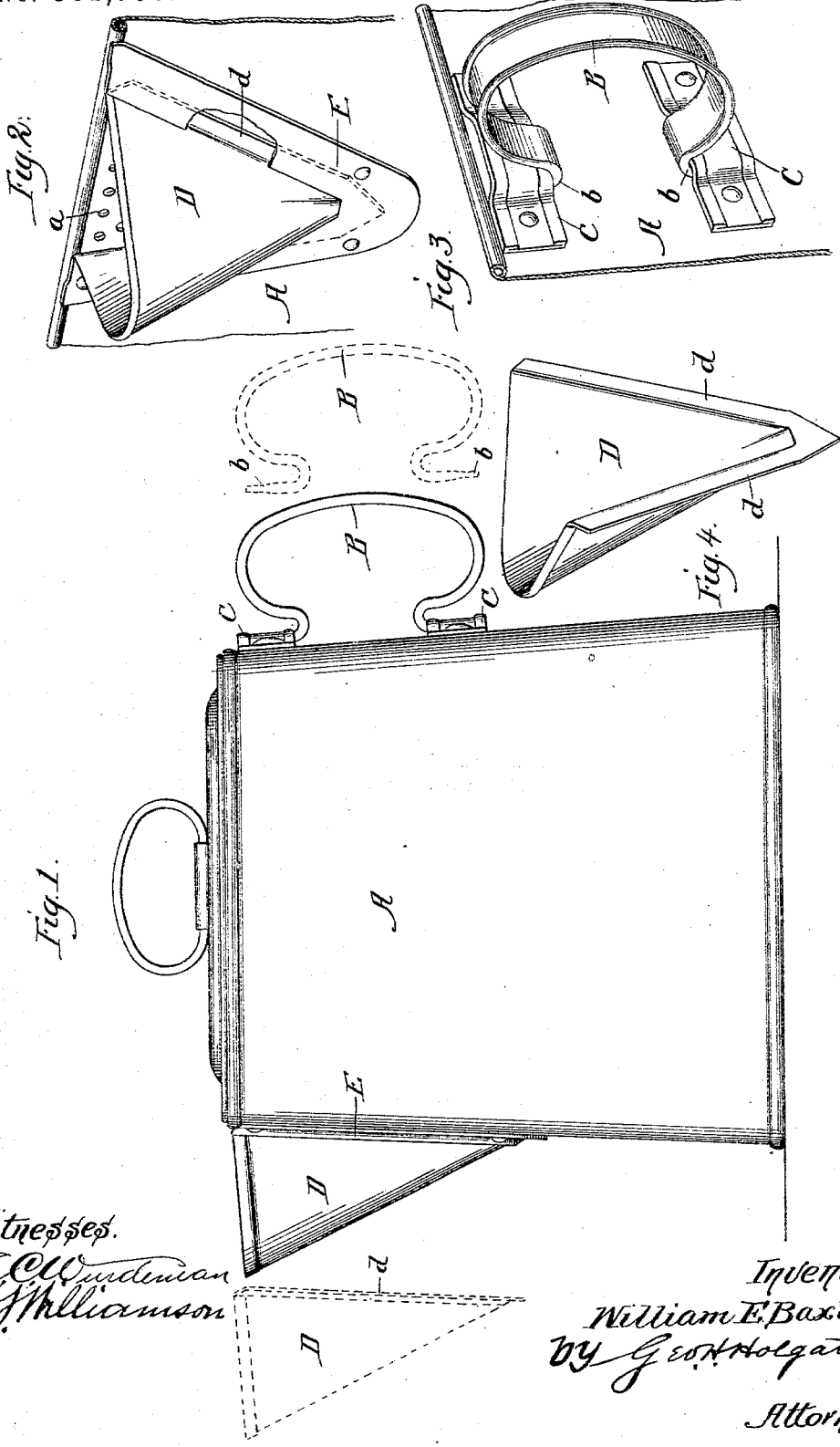

UNITED STATES PATENT OFFICE.

WILLIAM E. BAXTER, OF FRANKFORT, KENTUCKY.

CAMPER'S KIT.

SPECIFICATION forming part of Letters Patent No. 561,756, dated June 9, 1896.

Application filed January 15, 1896. Serial No. 575,645. (No model.)

*To all whom it may concern:*

Be it known that I, WILLIAM E. BAXTER, a citizen of the United States, residing at Frankfort, in the county of Franklin and State of Kentucky, have invented certain new and useful Improvements in Close-Packing Campers' Kits, of which the following is a specification.

My invention relates to a new and useful improvement in close-packing kits for campers and the like, and has for its object to provide such a kit in which is included a coffee-pot of nearly the same size as the entire outfit when packed, and is so arranged that the handle and spout of such a pot are to be removable therefrom, thereby greatly facilitating the close packing thereof, and also provide a number of other necessary utensils so shaped and sized as to be packed within the coffee-pot.

With these ends in view my invention consists in the details of construction and combination of elements hereinafter set forth and then specifically designated by the claim.

In order that those skilled in the art to which this invention appertains may understand how to make and use the same, I will describe its construction and operation in detail, referring by letters and numerals to the accompanying drawings, forming a part of this specification, and in which—

Figure 1 is a side elevation of my improved packing coffee-pot; Fig. 2, a perspective of a portion thereof, showing the spout in its assembled position, a part of the guideway being broken away to clearly show its arrangement; Fig. 3, a similar view of a portion of the pot, showing the handle in its assembled position; Fig. 4, a detail perspective of the spout locked rearward; Fig. 5, a perspective of the several articles packed within the outer pail, the cover of the latter being removed; Fig. 6, a central vertical section showing the several articles in their proper relative position when packed for transit, and Fig. 7 a perspective of the several utensils when unpacked.

Similar letters and numerals denote like parts in all the views of the drawings.

In carrying out my invention I provide a kettle or bucket 1, of the size and shape of the desired kit when packed, and a wire bail 2, the ends of which are hooked so as to engage with suitable holes 3 in the upper edge of the kettle, and a cover 4 is also provided for closing this kettle, which may have a ring 5 for its removal. The pail 6 is made somewhat smaller and of the same general shape as the kettle 1, so as to be readily placed within the latter, as shown in Figs. 5 and 6. This pail is also provided with a wire bail 7, adapted to engage suitable holes upon the upper edge thereof in the same manner and for the same purpose as that described in connection with the kettle.

The coffee-pot A is made of the same general shape as the above-described utensils, though preferably slightly tapering from bottom to top, and the handle B is formed into the shape shown in dotted lines in Fig. 1 of a piece of tin or other suitable metal having some resiliency, and the ends B thereof are adapted to engage with the sockets formed by the strips C, being riveted to the rear portion of the coffee-pot. To secure this handle in place, it is only necessary to spring the ends toward each other, insert them in the sockets, and permit them to spring apart by the resiliency of the handle, and when in place this handle will be as though secured permanently to the pot, yet it may be readily removed therefrom by reversing the operation required to secure it in place. Secured to the front of the pot by means of rivets is a V-shaped strip E, the inner edge of which is so formed as to leave a space therebetween and the pot into which the flanges $d$ of the spout D are adapted to be forced, and when forced the spout will be held firmly in the position shown in Figs. 1 and 2, but it may be withdrawn therefrom by exerting sufficient pressure thereon. To pack the coffee-pot within the pail 6, the spout and handle are removed, as already described, and the coffee-pot slipped within said pail. When, after the removal of the bails 2 and 7 from the kettle and pail, respectively, the latter is placed within the former and said bails are utilized to hold the coffee-pot within the pail by forcing them against their spring-action between the coffee-pot and the insides of the pail, the hooked ends of the bails bearing upon the top of the coffee-pot, as clearly shown in Figs. 5 and 6, before the coffee-pot has been secured in place within the pail, its interior may be filled with a great variety of utensils and implements, which I usually prefer to consist of a salt-box 8, pepper-box 9, sugar-case 10, a number of cups 11, and an equal number of spoons 12, which will leave sufficient room to place within the coffee-pot the spout and handle thereof, which has previously been removed and has already been described. These latter articles, as shown in Fig. 6 in dotted lines, may be placed beneath the inverted cups. After this kit has been thus packed there is yet considerable room left within the top of the coffee-pot, in which a number of articles, such as napkins and the like, may be placed.

I have shown the cups as having detachable handles; but it is not essential that they have handles at all, as for the use to which they are put handles are usually superfluous.

The kind and number of implements and utensils which are to be placed within the coffee-pot are immaterial to my present invention, the gist of which rests in the broad idea of providing a close-packing coffee-pot in connection with a pail, which may be used as a water-pail and also a kettle, which is usually used for soups and the like.

Having thus fully described my invention, what I claim as new and useful is—

In combination, a kettle provided with a removable handle, a pail fitting in the kettle, a coffee-pot fitting in the pail and held therein by the bails and pail, said coffee-pot having a removable spout and handle, as and for the purpose described.

In testimony whereof I have hereunto affixed my signature in the presence of two subscribing witnesses.

WILLIAM E. BAXTER.

Witnesses:
S. S. WILLIAMSON,
M. PIERCE.